3,375,251
PHENAZINE DERIVATIVES

Gerald R. Aldridge, Elizabeth, N.J., assignor to E. I. du Pont de Nemours and Company, Wilmington, Del., a corporation of Delaware
No Drawing. Filed Oct. 12, 1965, Ser. No. 495,332
7 Claims. (Cl. 260—267)

ABSTRACT OF THE DISCLOSURE

Yellow pigments comprising 4,5,6,12,13,14-hexahydrodiisoquino-[5,4-ab,5',4'-hi]-phenazine-4,6,12,14 - tetrone and its derivatives wherein the imide groups are substituted with a lower alkyl, aryl, or a heterocyclic radical. Also included is a process for the preparation of these compounds which comprises the catalytic condensation-oxidation of a 3-amino derivative of naphthalic anhydride or imide.

---

This invention relates to a new class of yellow pigment dyestuffs and more particularly to derivatives of phenazine which are distinguished by their low solubility in organic liquids.

Pigments intended for the printing of wax paper for food wrapping or packaging must meet stringent requirements. Among these is freedom from solubility in the wax coating which is commonly termed "good bleed resistance." In addition, the pigments must be non-toxic.

Available yellow pigments for such applications leave much to be desired. The inorganic pigments derived from lead chromate cannot be used because of their toxicity. The common organic monoazo yellow pigment dyestuffs show excessive bleed in paraffin wax. Even the disazo yellow pigments commonly known as "Benzidine Yellows" still exhibit significant solubility in hot paraffin wax, and are therefore not completely satisfactory. Certain organic yellow pigments such as flavanthrone are suitable for this application, but their high cost precludes extensive use. There is consequently a need for a non-toxic yellow pigment of good resistance to bleed in paraffin wax and of reasonable cost to meet the requirements of the food packaging industry.

An object of this invention is to produce a useful yellow pigment.

Another object is to produce a yellow pigment which has a low solubility in organic liquids.

A still further object is to produce an inexpensive yellow pigment which has good bleed resistance in paraffin wax and is non-toxic.

These objects are accomplished by the following invention. It has now been found that certain derivatives of phenazine, notably the compound 4,5,6,12,13,14-hexahydrodiisoquino - [5,4-ab,5',4'-hi] - phenazine - 4,6,12,14-tetrone and derivatives thereof wherein the hydrogen of the imide nitrogen atoms may be substituted, constitute valuable yellow pigments having excellent resistance to bleed in paraffin wax. These compounds may be represented by the structural formula:

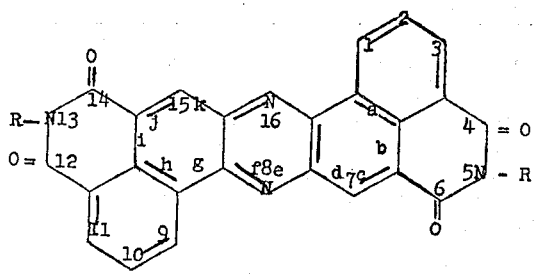

wherein R may be hydrogen, a lower alkyl, aryl, or a heterocyclic radical.

For purposes of this invention, a lower alkyl includes groups such as methyl, ethyl, propyl and butyl, and the branched isomers thereof, such as isopropyl, isobutyl, sec.-butyl and tert.-butyl. Higher alkyl substituents are unsatisfactory because they promote solubility of the pigment in organic media such as paraffin wax. As can be seen from the examples given below, compounds containing various phenyl radicals, both substituted and unsubstituted, have been successfully used. These include phenyl, 4-methoxyphenyl, 4-chlorophenyl, 2-chlorophenyl and 2-benzimidazolyl.

A number of syntheses may be employed to prepare the desired compounds. These include:

(1) The catalytic condensation-oxidation of a 3-amino derivative of naphthalic anhydride or imide:

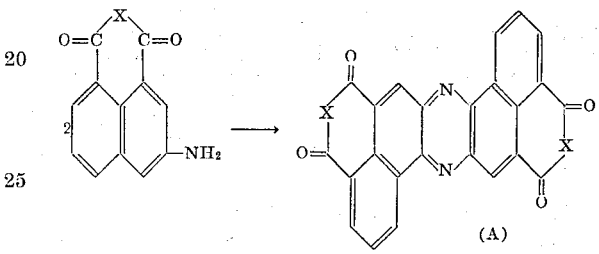

(A)

wherein X may be oxygen or NR and R is defined as above.

(2) Treatment of the dianhydride (Formula A, where X is oxygen) with an amine:

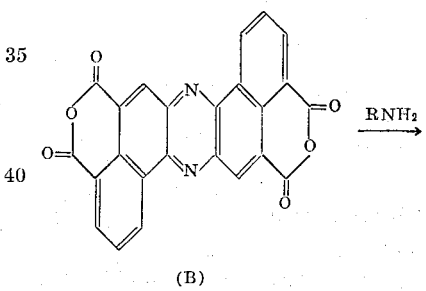

(B)

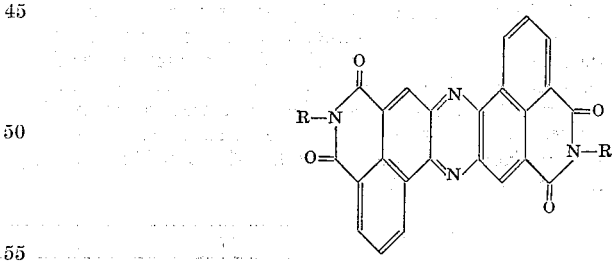

(C)

(3) Oxidation of the preformed dihydrophenazine, a step which in all probability takes place in synthesis (1) supra:

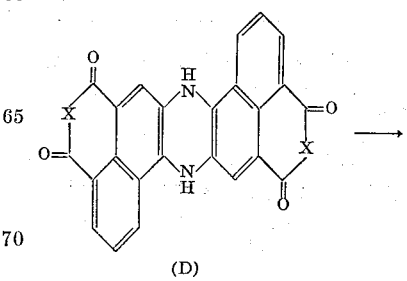

(D)

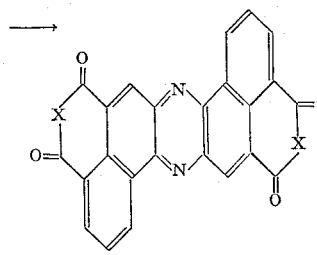

For a clearer understanding of the invention, the following specific examples are given. These examples are intended to be merely illustrative of the invention and not in limitation thereof. Unless otherwise specified, all parts are by weight.

EXAMPLE I-A.—DIANHYDRIDE (FORMULA B)

To a solution of 18.7 parts of antimony pentachloride in 60 parts of nitrobenzene at 57° C. was added 4.5 parts of 3-aminonaphthalic anhydride. The mixture was heated for 30 minutes at 170 to 180° C. and then for 3 hours at 195 to 205° C. After cooling to 170° C., the product was isolated by filtration and washed with nitrobenzene and then with alcohol. Yield was 2.9 parts of a yellow crystalline solid. The product melted above 400° C.

*Analysis.*—N found, 6.49%. N calc. for $C_{24}H_8N_2O_6$, 6.67%.

EXAMPLE I-B.—TETRACARBOXYLIC ACID

A mixture of 1.2 parts of the product of Example I-A, 3.3 parts of potassium hydroxide, 550 parts of water, and 168 parts of diethylene glycol was heated for 4 hours at approximately 100° C., following which it was filtered hot. The pH of the filtrate was adjusted to below 5 by the addition of acetic acid, whereupon a yellow solid was precipitated. This was isolated by conventional means. Yield: 1 part. The product melted above 400° C.

*Analysis.*—N found, 6.44%. N calc. for $C_{24}H_{12}N_2O_8$, 6.14%. Neutralization equiv., 120. N.E. calc. for $C_{20}H_8N_2(COOH)_4$, 114.

These data demonstrate that the product of Example I-B is the tetracarboxylic acid. This conclusion plus the nitrogen analysis for the product of Example I-A prove that the latter is the dianhydride.

EXAMPLE 2.—IMIDE (FORMULA C, R=H)

A mixture of 528 parts of antimony pentachloride, 1645 parts of nitrobenzene and 137 parts of 3-aminonaphthalimide was heated for 30 minutes at 170 to 180° C. and then for 3 hours at 190 to 205° C. The mixture was filtered at 190° C. and the product was washed with nitrobenzene. The presscake was then reslurried in methanol, filtered, washed with alcohol and dried. A greenish-yellow product was obtained. Yield: 146 parts. The product melted above 360° C.

The product was purified by recrystallizing twice from concentrated sulfuric acid and then by extracting with boiling dimethyl formamide.

*Analysis.*—Found: C, 68.77%; H, 2.96%; N, 13.0%. Calc. for $C_{24}H_{10}N_4O_4$: C, 68.9%; H, 2.4%; N, 13.4%.

EXAMPLE 3.—ACID RECRYSTALLIZATION

Forty-six parts of the crude product described in paragraph 1 of Example 2 was added gradually to 910 parts of 99% sulfuric acid at 10° C. or lower. After stirring for 1 hour, solution was complete. The acid concentration was reduced by the gradual addition of water (up to 290 parts) with constant stirring, the rate of dilution being regulated so that the temperature of the mixture did not rise above 20° C. After stirring for an additional hour, the mixture was filtered and the orange presscake was washed with 65% sulfuric acid. The presscake (sulfate of the imide) was hydrolyzed by treating with ice and water, following which the imide was isolated by filtration, washing and drying. Yield: 27.3 parts.

EXAMPLE 4.—ALTERNATE SYNTHESIS OF IMIDE (FORMULA C, R=H)

A mixture of 8.5 parts of 3-aminonaphthalimide, 10 parts of cupric oxide, and 870 parts of trichlorobenzene was boiled for 5 hours. During the heating period, the solvent lost by distillation was intermittently replenished with fresh trichlorobenzene. The reaction mixture was then diluted with 290 parts of trichlorobenzene and filtered at 200° C. The dark green presscake was washed with alcohol until free of trichlorobenzene, and dried. Yield was 12.5 parts of a greenish yellow product. The mixture was further purified by extraction with trichlorobenzene at 200° C., filtration, washing, etc.

To remove any metallic copper in the product, 11 parts of the latter was treated with 523 parts of 27% nitric acid for 4 hours at 90 to 100° C. The mixture was cooled and filtered. The presscake was washed acid free and dried. The infrared absorption spectrum of this product was similar to that of the product obtained in Example 2, thus demonstrating the identity of the two products.

EXAMPLE 5.—N-4-METHOXYPHENYLIMIDE (FORMULA C, R=4-METHOXYPHENYL)

A mixture of 23.5 parts of the dianhydride (Example I-A) and 140 parts of p-anisidine was heated for 2 hours at 140 to 190° C. After cooling to 100° C., the mixture was poured into 9500 parts of water acidified with 150 parts of hydrochloric acid (36% HCl). The mixture was stirred and the precipitated greenish yellow product was isolated in the conventional manner by filtration, washing, etc. Yield: 35.5 parts. The product melted above 400° C.

The product, after two recrystallizations from sulfuric acid, extraction with boiling dimethyl formamide and two recrystallizations from alpha-chloronaphthalene, analyzed as follows:

*Analysis.*—N found, 8.29%. N calc. for $C_{38}H_{22}N_4O_6$, 8.89%.

The following additional preparations were made according to the procedure of Example 2, but using instead of the unsubstituted 3-aminonaphthalimide the indicated N-substituted derivative:

| Example | Reactants | Imide Product | Yield, g. | Color |
| --- | --- | --- | --- | --- |
| 6 | 528 g. SbCl₅, 144 g. 3-amino-N-methyl-naphthalimide. | N-methyl | 96 | Greenish yellow. |
| 7 | 28 g. SbCl₅, 10 g. 3-amino-N-phenyl-naphthalimide. | N-phenyl | 6 | Yellow. |
| 8 | 140 g. SbCl₅, 56.5 g. 3-amino-N-4-chlorophenylnaphthalimide. | N-4-chlorophenyl | 35 | Do. |
| 9 | 60 g. SbCl₅, 25 g. 3-amino-N-2-chlorophenylnaphthalimide. | N-2-chlorophenyl | 10 | Do. |

All of the above products were purified by recrystallization from sulfuric acid (as outlined in Example 3) and by extraction with boiling dimethyl formamide. Melting points in all cases were above 400° C.

The following imides (Formula C, where R is as specified) were made according to the procedure of Example 5, but substituting for the p-anisidine of the latter the particular amine indicated:

Infrared absorption spectrum identical to that of product in Example 7.

EXAMPLE 10

Reactants _____ 1 g. dianhydride (Example I–A) 20 g. aniline.
Formula C _____ R=phenyl.
Yield _____ Not recorded.
Color _____ Yellow.

EXAMPLE 11

Reactants _____ 4.2 g. dianhydride (Example I–A) 3.9 g. 2-aminobenzimidazole.
Formula C _____ R=2-benzimidazolyl.
Yield _____ 5 g.
Color _____ Yellow.

The product of Example 11 was recrystallized from sulfuric acid as already described. It melted above 400° C.

EXAMPLE 12.—ALTERNATE SYNTHESIS OF N-METHYLIMIDE (FORMULA C, R=CH₃)

To 300 parts of nitrobenzene were added 8.7 parts of 4-bromo-N-methylnaphthalimide, 7.5 parts of 3-amino-N-methylnaphthalimide, 1.6 parts of cupric chloride (anhydrous), and 6.6 parts of potassium carbonate. The mixture was heated for 14 hours at 195 to 205° C. It was cooled to 160° C. and filtered. The presscake was washed successively with nitrobenzene, alcohol, and water, in each case until no trace of the preceding was solvent was detectable. The water washing was continued until the filtrate was free of chloride ions. Drying of the presscake yielded 2 parts of a brown solid of melting point above 400° C. Two recrystallizations from nitrobenzene gave a yellow solid.

*Analysis.*—Found: C, 69.1%; H, 3.0%; N, 12.8%. Calc. for $C_{26}H_{14}N_4O_4$: C, 70.0%; H, 3.1%; N, 12.5%.

The infrared absorption spectrum of this product was identical with that of the product obtained in Example 6.

The examples cited are not intended to impose undue limitation on the scope of the invention. Thus considerable latitude in the choice of the substituent on the imide group is permissible. If for example, a toluidine (any isomer) is substituted in stoichiometric quantity for the p-anisidine of Example 5, the corresponding N-tolylimide (Formula C, R=tolyl) will be obtained. Likewise, substitution of the stoichiometric amount of alpha- or beta-naphthylamine would yield the corresponding N-naphthylimide (Formula C, R=alpha-naphthyl or beta-naphthyl). Also the corresponding imides may be prepared by suitable modification of alternate syntheses, such as are described in Examples 2, 4 and 12.

The bleed resistance of these pigments in paraffin wax is tested as follows. The pigment is ground in lithographic varnish in the customary manner and prints of the resulting link are made on regular Litho label paper. The dried print is cut into strips 1½ inches wide, and each strip is passed very slowly through a container of molten paraffin wax at about 200° C. For control purposes a strip of unprinted paper is similarly tested. The molten wax from each test is poured into uniform containers to equal depth, where it is allowed to solidify. By comparison of the color of the wax from the test specimen with that of the control, the bleed is determined.

By this test all of the pigments described in the foregoing examples show no bleed whatsoever. Monoazo yellow pigment dyestuffs, on the other hand, show very severe bleed. The disazo pigments (Benzidine Yellows), though they show less bleed than the monoazos, still bleed perceptibly, varying somewhat in degree depending on their particular chemical composition.

In the condensation-oxidation of a 3-aminonaphthalimide, it is believed that the first step involves the formation of the N,N′-dihydrophenazine (Formula D) which in turn is oxidized to the desired phenazine. Consequently, it is believed that the catalyst, be it a halide or an oxide, should be so selected that the metal thereof is in the highest oxidation state. In addition to $SbCl_5$, $CuCl_2$ and CuO cited in the examples, other possible catalysts may include $AsCl_5$, $SnCl_4$, $TiCl_4$, $FeCl_3$, HgO and $MnO_2$. The mole ratio of catalyst to aminonaphthalimide should be above 1, with preferred results being obtained at a mole ratio of about 2.5. Higher amounts are permissible, though not desirable once conditions for the attainment of maximum yield are realized.

Temperatures of reaction may be varied over wide limits. In general, however, maximum yields in minimum time of reaction are realized at reaction temperatures in the range of 175 to 225° C., depending on the solvent medium selected for the reaction.

The choice of solvent is dictated largely by the foregoing temperature considerations, as well as its non-reactivity with the catalyst. In addition to nitrobenzene, other inert solvents boiling around 200° C. are eminently suited. Among these are o-dichlorobenzene and trichlorobenzene. The quantity of solvent selected is not critical and is governed largely by such factors as cost, stirrability and ease of recovery.

An advantage of the compounds of this invention is that they are useful yellow pigments as obtained. Their strength and tinctorial properties may be further enhanced by established methods of particle size reduction, such as acid pasting, milling, etc., which are fully reviewed in the copending application of Braun, U.S. Serial No. 448,240. Thus, the imide (Example 2) is approximately as strong as Benzidine Yellow C.I. 21095 (among the strongest known organic yellow pigments) when tested in alkyd or acrylic vehicles, and it is fully equal thereto in intensity (color purity). Furthermore, it is markedly superior in lightfastness, regardless of the vehicle system in which it is employed.

Another advantage is the excellent bleed resistance, as exemplified by the hot paraffin wax test, which is evident in other applications wherein the observed behavior of the pigment is determined by its solubility in the vehicle system in which it is employed. Thus, the pigments of this invention are completely resistant to migration in plastics, such as polyvinyl chloride, and are non-bleeding in lacquers and enamels, such as are based on nitrocellulose, alkyd, and acrylic resins.

It will be understood that various changes in the details, materials, steps, and arrangements of parts, which have been herein described and illustrated in order to explain the nature of the invention, may be made by those skilled in the art within the principle and scope of the invention as expressed in the appended claims.

The invention claimed is:

1. A compound having the structural formula,

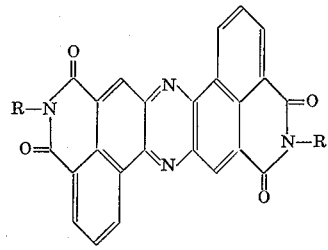

wherein R is selected from the group consisting of hydrogen, a lower alkyl, phenyl, methoxyphenyl, tolyl, naphthyl, chlorophenyl, and benzimidazolyl.

2. The compound of claim 1 wherein R is hydrogen.
3. The compound of claim 1 wherein R is methyl.
4. The compound of claim 1 wherein R is an aryl radical selected from the group consisting of phenyl and chlorophenyl.
5. A yellow pigment consisting essentially of a compound of claim 1.

6. A process for preparing the compounds of claim 1 comprising heating a 3-aminonaphthalimide wherein the 4-position is unsubstituted to a temperature of 150 to 250° C. in an inert organic liquid and in the presence of a catalyst, wherein said catalyst is selected from the group consisting of $SbCl_5$, $CuCl_2$ and CuO.

7. The process of claim 6 wherein said catalyst is $SbCl_5$.

No references cited.

HENRY R. JILES, *Primary Examiner*